US008978617B2

(12) United States Patent
Matsuda

(10) Patent No.: US 8,978,617 B2
(45) Date of Patent: Mar. 17, 2015

(54) MOUNTING STRUCTURE FOR BATTERY AND FUEL TANK OF GASOLINE-ELECTRIC HYBRID VEHICLE

(71) Applicant: Fuji Jukogyo Kabushiki Kaisha, Tokyo (JP)

(72) Inventor: Hiroshi Matsuda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/724,225

(22) Filed: Dec. 21, 2012

(65) Prior Publication Data

US 2013/0174804 A1    Jul. 11, 2013

(30) Foreign Application Priority Data

Jan. 6, 2012   (JP) .................. 2012-001182

(51) Int. Cl.
| | | |
|---|---|---|
| F02B 61/04 | (2006.01) | |
| F02B 77/00 | (2006.01) | |
| B60K 1/04 | (2006.01) | |
| B60K 15/063 | (2006.01) | |
| B60K 13/04 | (2006.01) | |
| B60K 17/22 | (2006.01) | |
| B60K 17/34 | (2006.01) | |
| B60K 11/06 | (2006.01) | |
| B60K 1/00 | (2006.01) | |

(52) U.S. Cl.
CPC . *F02B 77/00* (2013.01); *B60K 1/04* (2013.01); *B60K 15/063* (2013.01); *B60K 13/04* (2013.01); *B60K 17/22* (2013.01); *B60K 17/34* (2013.01); *B60K 2001/0433* (2013.01); *B60K 2015/0633* (2013.01); *B60K 11/06* (2013.01); *B60K 2001/005* (2013.01)
USPC ............... 123/198 R; 123/198 E; 180/65.21; 180/68.5; 180/69.4

(58) Field of Classification Search
CPC ......... B60W 20/00; B60K 15/03; B60K 6/44; B60R 16/04
USPC ........... 123/198 R, 198 E; 180/65.21, 65.245, 180/65.22, 65.225, 68.5
See application file for complete search history.

(56) References Cited

U.S. PATENT DOCUMENTS

2008/0000703 A1*  1/2008  Shindou .................. 180/68.5
2011/0168468 A1*  7/2011  Taguchi et al. .......... 180/65.245

FOREIGN PATENT DOCUMENTS

| JP | 2000-247261 | 9/2000 |
| JP | 2012-148749 | 8/2012 |

\* cited by examiner

*Primary Examiner* — Lindsay Low
*Assistant Examiner* — Omar Morales
(74) *Attorney, Agent, or Firm* — Smith, Gambrell & Russell, LLP

(57) ABSTRACT

There is provided a mounting structure for a battery and a fuel tank of a gasoline-electric hybrid vehicle. The mounting structure allows the battery to be disposed on one side of a propeller shaft, and the fuel tank to be disposed on the other side of the propeller shaft. The propeller shaft is disposed in the center of the vehicle and below the bearing surface of the rear seat, under the floor of the vehicle body so as to substantially extend in the fore-aft direction of the vehicle.

14 Claims, 3 Drawing Sheets

MOUNTING STRUCTURE FOR BATTERY AND FUEL TANK OF GASOLINE-ELECTRIC HYBRID VEHICLE

CROSS-REFERENCE TO RELATED APPLICATIONS

The present application claims priority from Japanese Patent Application No. 2012-001182 filed on Jan. 6, 2012, the entire contents of which are hereby incorporated by reference.

BACKGROUND OF THE INVENTION

1. Field of the Invention

The present invention relates to a mounting structure for a battery and a fuel tank of a gasoline-electric hybrid vehicle, and particularly to a mounting structure that can be implemented even for a gasoline-electric hybrid vehicle having a propeller shaft, the mounting structure allowing the vehicle to provide a cabin and/or cargo space, to have the center of gravity at a low position, and to use parts commonly used in a gasoline engine vehicle.

2. Description of the Related Art

In a gasoline-electric hybrid vehicle, which uses both an engine and an electric motor for generating driving power, it is a challenge to ensure a space for mounting a fuel tank and a battery. Conventionally, there is known a structure in which a fuel tank is disposed below the rear seat similarly to a typical gasoline engine vehicle, and a battery is disposed on the back side of the rear seat or below the floor of a cargo space in the back of the rear seat. However, when a battery is disposed on the back side of the rear seat, the depth dimension of the cargo space is reduced, and thus seat arrangement such as a "trunk through" cannot be made by folding down the back rest of the rear seat. In the case where the battery is disposed under the floor of the cargo space, loading and unloading a cargo tends to be difficult due to the raised floor surface, and a sufficient height for a cargo cannot be ensured. In order to ensure the height for a cargo, a solution such as raising the floor surface of the trunk is necessary, and thus a significant restriction in design of a hybrid vehicle is imposed and it is difficult to ensure a driver's view at the same time. In addition, when the battery is disposed at one of the above-described positions, the center of gravity of the vehicle is raised, and thus the running stability of the vehicle is lowered.

On the other hand, there is also proposed a technology that disposes a battery, for example, in a center console in the cabin. In this case, however, a passenger space in the cabin and a storage space are sacrificed. In addition, in the consideration of safety in case of a collision, the battery is preferably disposed outside the cabin. There is also proposed a technology that disposes a battery under the floor panel of an electric vehicle driven only by an electric motor. For example, Japanese Unexamined Patent Application Publication (JP-A) No. 2000-247261 describes a vehicle body floor structure in which a center portion of the floor panel of the vehicle in the vehicle width direction is formed in a substantially hat shape, and a battery is installed below this projecting center portion.

The technology described in JP-A No. 2000-247261 cannot be applied to a four-wheel drive vehicle and a rear-wheel drive vehicle in which a propeller shaft is disposed at a center portion of the vehicle in the vehicle width direction. In addition, the technology described in JP-A No. 2000-247261 is directed to an electric vehicle, which is driven only by an electric motor, and does not consider a vehicle structure that has a fuel tank. Furthermore, in the case where a gasoline engine vehicle and a hybrid vehicle are produced as variations from a common platform, designing two types of floor panel separately increases the number of development steps and investment of production facility

SUMMARY OF THE INVENTION

In view of the above, it is an object of the present invention to provide a mounting structure for a battery and a fuel tank of a gasoline-electric hybrid vehicle, the mounting structure being able to be implemented even for a gasoline-electric hybrid vehicle having a propeller shaft, and allowing the vehicle to provide a cabin and/or cargo space, to have the center of gravity at a low position, and to use parts that are commonly used in a gasoline engine vehicle.

A mounting structure for a battery and a fuel tank of a gasoline-electric hybrid vehicle according to a first aspect of the invention disposes a battery on one side of a propeller shaft, and a fuel tank on the other side of the propeller shaft. The propeller shaft is disposed in the center of the vehicle and below a bearing surface of a rear seat, under a floor of the vehicle body so as to substantially extend in a fore-aft direction of the vehicle. With this structure, modification of the vehicle body of a gasoline engine vehicle that is not equipped with a battery pack can be minimized by disposing the fuel tank and the battery pack on the respective sides of the propeller shaft on the left and right, instead of disposing an existing saddle type fuel tank that is installed so as to straddle the propeller shaft. Accordingly, the gasoline-electric hybrid vehicle can have a space in the cabin and the trunk compartment comparable to those of a gasoline engine vehicle. Therefore, design of a hybrid vehicle is not restricted. In addition, the center of gravity of the vehicle can be lowered.

Preferably, the battery and the fuel tank are disposed between a cross member and a rear sub frame, the cross member being disposed below the rear seat so as to substantially extend in a width direction of the vehicle, and the rear sub frame being connected with a suspension arm of a rear wheel suspension. With this structure, the battery pack and the fuel tank are disposed in a portion surrounded by the cross member and the rear sub frame which are relatively rigid members constituting part of the vehicle body, and thus the battery pack and the fuel tank can be protected against damage from a side collision and a rear collision (bumped in the rear end) of the vehicle.

Preferably the fuel tank and a fill opening for supplying fuel to the fuel tank are disposed on an opposite side of an outlet of an exhaust pipe of an engine in the left-right direction of the vehicle body. This structure can prevent ignition of spilt fuel due to the heat of the outlet of the exhaust pipe when the fuel is refilled.

DESCRIPTION OF THE PREFERRED EMBODIMENTS

The present invention provides a mounting structure for a battery and a fuel tank of a gasoline-electric hybrid vehicle by disposing the battery and the fuel tank on respective sides of the propeller shaft below the floor panel under the bearing surface of the rear seat, the mounting structure being able to be implemented even for a gasoline-electric hybrid vehicle having a propeller shaft, and allowing the vehicle to provide a cabin and/or cargo space, to have the center of gravity at a low position, and to use parts that commonly used for a gasoline engine vehicle.

[Embodiments]

Figure 1:
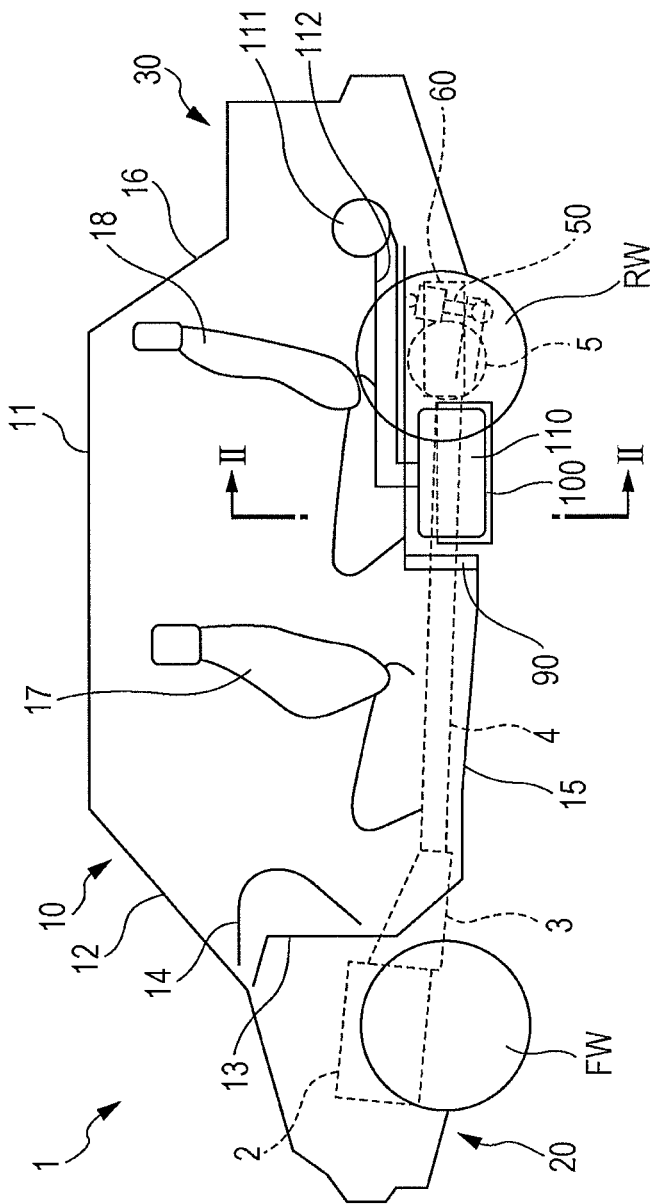
FIG. 1 is a schematic side perspective view of a vehicle having an embodiment of a mounting structure for a battery and a fuel tank of a gasoline-electric hybrid vehicle according to the present invention.
Figure 2:
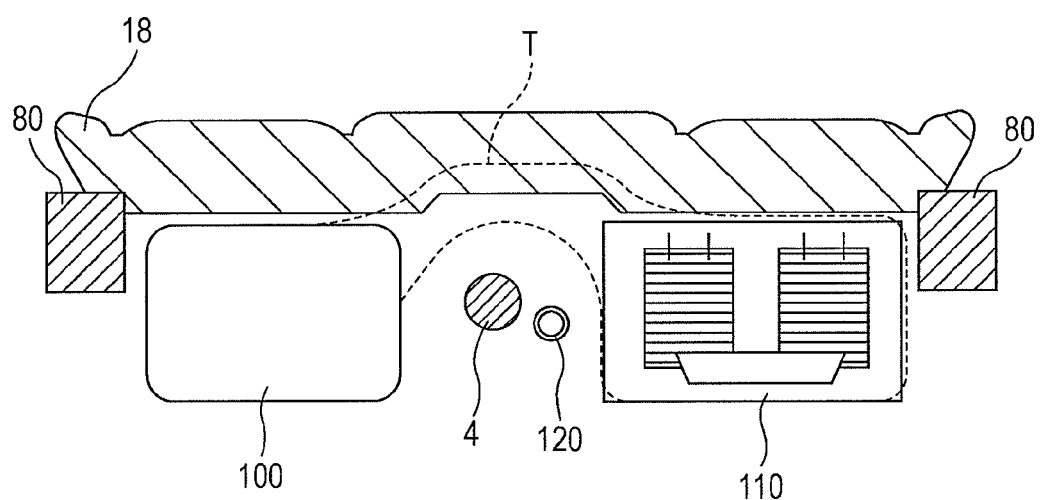
FIG. 2 is a schematic cross-sectional view taken along a line II-II of FIG. 1.
Figure 3:
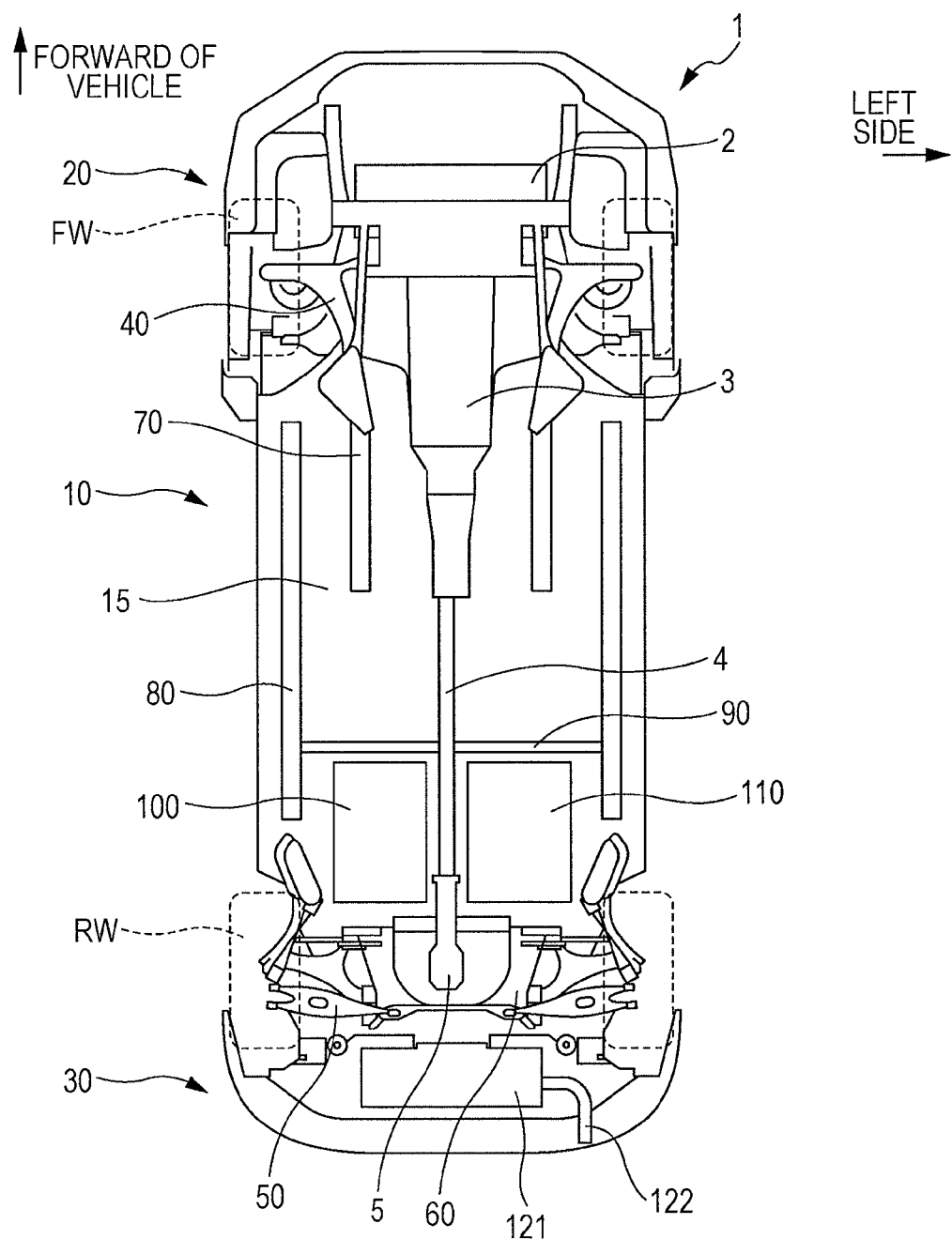
FIG. 3 is a schematic plan view from below of the floor of the vehicle of FIG. 1.

Hereinafter, an embodiment of a mounting structure for a battery and a fuel tank of a gasoline-electric hybrid vehicle according to the present invention will be described. FIG. 1 is a schematic perspective side view of s vehicle. FIG. 2 is a schematic cross-sectional view taken along the line II-II of FIG. 1. FIG. 3 is a schematic plan view from below of the floor of the vehicle of FIG. 1. A vehicle 1 to which the mounting structure for a battery and a fuel tank according to the embodiment is applied is, for example, a gasoline-electric hybrid vehicle that uses both a gasoline engine and an electric motor for generating driving power, and can perform regenerative power generation by using the electric motor as a generator. The vehicle 1 is, for example, a three-box sedan having an engine compartment 20 and a trunk compartment 30 in front and rear of a passenger space (cabin) 10, respectively. The vehicle 1 is an all-wheel drive (AWD) vehicle that has an engine 2 and a transmission 3 at the front of the vehicle 1 to drive the front wheels FW via a front differential installed in the transmission case and to drive the rear wheels RW via a propeller shaft 4, a rear differential 5, and the like.

The engine 2 is, for example, a horizontally opposed 4-cylinder engine with 4 strokes, and is vertically mounted at the front of the vehicle. The transmission 3 is disposed in the rear of the engine 2 to accelerate and decelerate the output rotational speed of the engine 2. The case of the transmission 3 houses an AWD transfer that distributes driving power to the front and rear wheels, a front differential that transmits the driving power to the left and right wheels via a front drive shaft, and a motor generator that performs driving assistance by electric power and performs regenerative power generation. The propeller shaft 4 is a rotational shaft that is disposed so as to extend in the vehicle rearward direction from the rear end of the transmission 3. The propeller shaft 4 transmits the driving power to the rear differential 5. The rear differential 5 transmits the driving power to the left and right rear wheels via a rear drive shaft.

The cabin 10 is a space in which passengers ride, and includes a roof 11, a windshield 12, a toe board 13, a dashboard 14, a floor panel 15, a rear glass 16, a front seat 17, and a rear seat 18. The roof 11 is the ceiling of the cabin 10. The windshield 12 is disposed so as to extend in the forward and downward directions of the vehicle from the front end of the roof 11. The toe board 13 extends in the downward direction from the lower end of the windshield 12, and further extends in the rear direction of the vehicle so that the distal end of the toe board 13 is connected with the front end of the floor panel 15. The dashboard 14 is an interior member that is disposed rearward of the toe board 13 so as to face the front seat 17. The dashboard 14 houses various instruments, an air conditioner, an audio navigation device, and the like.

The floor panel 15 is a component that constitutes part of the cabin 10. The main body of the floor panel 15, is formed in a substantially horizontal planar shape, and the center portion of thereof in the vehicle width direction has a floor tunnel in which the propeller shaft 4 and an exhaust pipe are disposed, the floor tunnel projecting inwardly of the cabin. The floor panel 15 extends upward near the front end of the bearing surface of the rear seat 18 so that the rear portion of the floor panel 15 is disposed at a position higher than the front portion of the floor panel 15. The rear glass 16 is formed so as to extend in the rearward and downward of the vehicle from the rear end of the roof 11. The front seat 17 and the rear seat 18 are disposed in the fore-aft direction of the vehicle, and passengers sit on the front seat 17 and the rear seat 18.

The engine compartment 20 houses the engine 2, and is disposed forward of the cabin 10. The front wheels FW are disposed laterally outside of the engine compartment 20.

The trunk compartment 30 is a baggage compartment (baggage space) for storing baggage, and is disposed rearward of the cabin 10. The rear wheels RW are disposed at the lateral sides of the vehicle, near the rear portion of the cabin 10 and the front portion of the trunk compartment 30.

As illustrated in FIG. 3, the vehicle 1 includes a front suspension 40, a rear suspension 50, a rear sub frame 60, front frames 70, side frames 80, a rear seat cross member 90.

The front suspension 40 supports a front bearing housing (not illustrated) that supports the front wheels FW such that the front bearing housing can be moved relatively to the vehicle and can be rotated in the steering direction. The rear suspension 50 supports a rear bearing housing (not illustrated) that supports the rear wheels RW such that the rear bearing housing can be moved relatively to the vehicle.

The rear sub frame 60 is a structural member to which the suspension arm of the rear suspension 50 is attached, and is formed by assembling pressed steel plates, for example, and welding them in a rectangular frame shape. The rear differential 5 is attached to a substantially center portion of the rear sub frame 60. The rear sub frame 60 is attached to the underside of the floor below the trunk compartment 30.

The front frame 70 is a structural member of the vehicle, and extends from the lateral side of the engine compartment 2 to a lower position of the front portion of the floor panel 15. The front frame 70 is formed in a beam shape having a closed cross-section. The vehicle 1 has a pair of the front frames 70, and these front frames 7 are disposed apart from each other in the vehicle width direction. The engine 2 and the transmission 3 are disposed between the front frames 70 on the left and right sides.

The side frames (side sill) 80 are structural members of the vehicle, and are disposed along the left and right lateral ends of the floor panel 15 throughout the entire length of the cabin 10. The front portions of the side frames 80 are disposed outwardly of the rear portions of the front frames 70 in the vehicle width direction. In addition, both ends of the bearing surface of the above-mentioned rear seat 18 are disposed near and above the side frames 80 on the left and right sides, respectively.

The rear seat cross member 90 is a structural member disposed along the floor panel 15 below the front end of the bearing surface of the rear seat 18, and connects the side frames 80 on the left and right sides.

The vehicle 1 further includes a fuel tank 100, a battery pack 110, and an exhaust pipe 120. The fuel tank 100 is a container for storing gasoline used as a fuel for the engine 2. The fuel tank 100 is formed, for example, in a box shape with substantially rectangular top, front, and side views. The fuel tank 100 is disposed between the side frame 80 on the right and the propeller shaft 4 in the width direction of the vehicle 1, and is disposed rearward of the rear seat cross member 90 and forward of the rear sub frame 60 in the fore-aft direction of the vehicle 1. The fuel tank 100 is provided with a feed pipe (not illustrated) that introduces gasoline into the fuel tank 100 from a fill opening (not illustrated) disposed at the right side of the vehicle body.

The battery pack 110 supplies electric power to the motor generator, and has a case for housing a battery that is recharged by generated electric power. The battery pack 110 is disposed between the side frame 80 on the left and the propeller shaft 4 in the width direction of the vehicle 1, and is disposed rearward of the rear seat cross member 90 and forward of the rear sub frame 60 in the fore-aft direction of the vehicle 1. The battery pack 110 includes a battery module having a plurality of modularized battery cells, a battery control unit (BCU), a distribution cable, a junction box, and a service plug.

The BCU measures the voltage, current, temperature, and the like of the battery module in order to monitor the input/output of the battery, perform cooling management, and monitor a high-voltage safety circuit, whereby the battery can be used safely and efficiently. The distribution cable is connected from the battery module to the motor generator or various auxiliary equipments. The junction box is a container for protecting terminals and/or ends are used for coupling, branching, or relaying the distribution cable. The service plug is blocks a high voltage so as to provide safe working conditions when the battery is attached or detached.

As illustrated in FIG. 1, the battery pack 110 includes a cooling fan 111 and a cooling duct 112 for cooling the battery module. The cooling fan 111 cools the heat generated when the battery module is charged or discharged, as well as the heat coming from the outside. The cooling fan 111 is disposed, for example, at the left lateral side of the trunk compartment 30. The cooling duct 112 introduces cool air from the cooling fan 111 into the battery pack 110. The cooling duct 112 is disposed at the left lateral side of the trunk compartment 30 in a substantially fore-aft direction. The downstream end (the end in the forward direction of the vehicle) of the cooling duct 112 is bent downward and connected to the upper surface of the battery pack 110.

In the case where the vehicle 1 is a plug-in hybrid vehicle which is charged by an outside power source, a charging terminal can be disposed on the left surface of the vehicle body. The difference in design when viewed from the left and right sides of the vehicle 1 can be minimized by disposing the charging terminal symmetrically to the above-mentioned fill opening.

As illustrated in FIG. 1, the lower surfaces of the fuel tank 100 and the battery pack 110 are disposed at the substantially same height as the floor panel 15 located forward of the foot area of the rear seat. The upper surfaces of the fuel tank 100 and the battery pack 110 are disposed adjacent to the lower surface of the floor panel 15 directly under the bearing surface of the rear seat 18.

The exhaust pipe 120 discharges an exhaust gas of the engine 2 to the outside of the vehicle. As illustrated in FIG. 2 the exhaust pipe 120 is disposed in the floor tunnel between the propeller shaft 4 and the battery pack 110. As illustrated in FIG. 3, a silencer 121 disposed near the outlet of the exhaust pipe 120 is provided below the floor near the rear end of the vehicle 1. Exhaust gas is discharged from the silencer 121 into a tail pipe 122 disposed on the opposite side to the fill opening in the left-right direction of the vehicle, i.e., disposed on the left side of the vehicle.

According to the above-described embodiment, the following effects can be achieved.

(1) Modification of the vehicle body of a gasoline engine vehicle which is not equipped with a battery pack can be minimized by disposing the fuel tank 100 and the battery pack 110 on the respective sides of the propeller shaft 4 on the left and right, instead of disposing an existing saddle type fuel tank T which is installed so as to straddle the propeller shaft 4 as indicated by a dashed line in FIG. 2. Thus, the space in the cabin 10 and the trunk compartment 30 can be comparable to that of a gasoline engine vehicle. Therefore, design of a hybrid vehicle is not restricted. In addition, the center of gravity of the vehicle can be lowered, thereby improving the running stability of the vehicle. In particular, an increase in front axle weight can be prevented and a difference in axle weights on both sides can be minimized by disposing the heavy fuel tank 100 and battery pack 110 on the left and right sides separately under the floor of the rear seat. Although the capacity of the fuel tank 100 is reduced to a level lower than that of the existing saddle type fuel tank T, the gasoline-electric hybrid vehicle of this type has a fuel consumption rate lower than that of a typical gasoline engine vehicle, and thus a sufficient cruising range of the vehicle can be achieved.

(2) The battery pack 110 and the fuel tank 100 can be protected against damage from a side collision and a rear collision (bumped in the rear end) of the vehicle by disposing the battery pack 110 and the fuel tank 100 in a portion surrounded by the rear seat cross member 90 and the rear sub frame 60 which are relatively rigid members constituting part of the vehicle body.

(3) Ignition of spilt fuel due to the heat of the exhaust pipe 120 when the fuel is refilled can be prevented by disposing the fuel tank 100 and the fill opening on the opposite side of the exhaust pipe 120 and its outlet, i.e., the tail pipe 122 in the left-right direction.

(4) Because the battery pack 110 and the cooling fan 111 can be disposed close to each other, the capacity of the cooling duct 112 can be reduced, more space can be created for efficient use, and the parts for the cooling duct 112 can be simplified.

[Modification]

The present invention can be modified or altered in various manners without being limited to the embodiment described above, and those modifications and alterations are also in the technical scope of the present invention.

(1) The structure, shape, disposition, and the like of each part of the vehicle which has the mounting structure for a battery and a fuel tank of a gasoline-electric hybrid vehicle according to the present invention are not limited to those of the embodiment described above, and may be changed as needed. For example, the positions of the battery and the fuel tank may be reversed on the left and right sides. In addition, another battery or fuel tank may be provided at a different part of the vehicle and used in combination with the battery and fuel tank of the above embodiment.

(2) Although the vehicle of the embodiment is an AWD vehicle with a front engine, the present invention is not limited to this and may be applied to a RWD vehicle that drives only the rear wheels.

(3) Although the engine is a gasoline engine and the fuel tank stores gasoline in the embodiment, the configuration is not limited to this. The engine may be, for example, a diesel engine that uses diesel oil as fuel or may be another engine that uses another fuel such as ethanol-based fuel, natural-gas-based fuel, or hydrogen fuel. Furthermore, the type of fuel stored in the fuel tank is not particularly limited.

(4) Although the vehicle in the embodiment is, for example, a three-box sedan, the present invention is not limited to this and may be applied to a two-box hatchback a station wagon vehicle, a SUV vehicle, or a three-row seat vehicle for many passengers. In this case, the fuel tank and the battery pack can be disposed on the left and right sides separately below the second row seat or the third row seat.

What is claimed is:

1. A mounting structure for a battery and a fuel tank of a gasoline-electric hybrid vehicle, comprising:
 a battery disposed on a first side of a propeller shaft;
 a fuel tank disposed on a second side of the propeller shaft, opposite the first side in the vehicle width direction, so as to be arranged in parallel with the battery, wherein
 the propeller shaft is disposed in the center of the vehicle and below a bearing surface of a rear seat, under a floor of the vehicle body so as to substantially extend in a fore-aft direction of the vehicle,
 the battery disposed between a cross member and a rear sub frame, the cross member being disposed below the rear seat so as to substantially extend in a width direction of the vehicle,
 the battery is disposed between the propeller shaft and a side frame on the first side of the propeller shaft, the fuel tank is disposed between the propeller shaft and a side frame on the second side of the propeller shaft, the side frames disposed along lateral ends, in the vehicle width direction, of the floor, the side frames being connected to each other in the width direction of the vehicle by the cross member,
 the battery and the fuel tank are disposed in a portion surrounded by the cross member, the rear sub frame, and the side frames, and
 a horizontal plane extending in the vehicle width direction passes through each of the battery, the fuel tank, and the propeller shaft.

2. The mounting structure for a battery and a fuel tank of a gasoline-electric hybrid vehicle according to claim 1, wherein the rear sub frame is connected to a suspension arm of a rear wheel suspension.

3. The mounting structure for a battery and a fuel tank of a gasoline-electric hybrid vehicle according to claim 1,
 wherein the fuel tank and a fill opening for supplying fuel to the fuel tank are disposed on an opposite side of the vehicle, in the vehicle width direction, relative to an outlet of an exhaust pipe of an engine.

4. The mounting structure for a battery and a fuel tank of a gasoline-electric hybrid vehicle according to claim 2,
 wherein the fuel tank and a fill opening for supplying fuel to the fuel tank are disposed on an opposite side of the vehicle, in the vehicle width direction, relative to an outlet of an exhaust pipe of an engine.

5. The mounting structure for a battery and a fuel tank of a gasoline-electric hybrid vehicle according to claim 1,
 wherein the battery and the fuel tank are disposed on opposite sides of the propeller shaft, in the vehicle width direction, in such a manner that no vertical plane, extending in the fore-aft direction of the vehicle, passes through any two of the battery, the fuel tank, and the propeller shaft.

6. The mounting structure for a battery and a fuel tank of a gasoline-electric hybrid vehicle according to claim 1,
 wherein the battery and the fuel tank are configured for simultaneous reception in a space configured for receiving a saddle type fuel tank.

7. The mounting structure for a battery and a fuel tank of a gasoline-electric hybrid vehicle according to claim 1,
 wherein the battery is accessible from below the vehicle without requiring removal of the fuel tank.

8. A mounting structure for a battery and a fuel tank of a hybrid liquid fuel-electric power vehicle, comprising:
 a battery disposed on a first side of a propeller shaft, and a fuel tank disposed on a second side of the propeller shaft, opposite the first side in the vehicle width direction, such that the propeller shaft extends between the battery and the fuel tank, wherein
 the propeller shaft is disposed below a bearing surface of a rear seat, under a floor of the vehicle body so as to substantially extend in a fore-aft direction of the vehicle, wherein
 the battery and the fuel tank are disposed between a cross member and a rear sub frame, the cross member being disposed so as to substantially extend in a width direction of the vehicle,
 the battery is disposed between the propeller shaft and a side frame on the first side of the propeller shaft, the fuel tank is disposed between the propeller shaft and a side frame on the second side of the propeller shaft, the side frames disposed along lateral ends, in the vehicle width direction, of the floor, the side frames being connected to each other in the width direction of the vehicle by the cross member,
 the battery and the fuel tank are disposed in a portion surrounded by the cross member, the rear sub frame, and the side frames, and
 a horizontal plane extending in the vehicle width direction passes through each of the battery the fuel tank, and the propeller shaft.

9. The mounting structure for a battery and a fuel tank of a hybrid liquid fuel-electric power vehicle according to claim 8,
 wherein the rear sub frame is connected to a suspension arm of a rear wheel suspension.

10. The mounting structure for a battery and a fuel tank of a hybrid liquid fuel-electric power vehicle according to claim 8,
 wherein the fuel tank and a fill opening for supplying fuel to the fuel tank are disposed on an opposite side of the vehicle, in the vehicle width direction, from an outlet of an exhaust pipe of an engine.

11. The mounting structure for a battery and a fuel tank of a hybrid liquid fuel-electric power vehicle according to claim 8,
 wherein the battery and the fuel tank are disposed on opposite sides of the propeller shaft, in the vehicle width direction, in such a manner that no vertical plane, extending in the fore-aft direction of the vehicle, passes through any two of the battery, the fuel tank, and the propeller shaft.

12. The mounting structure for a battery and a fuel tank of a hybrid liquid fuel-electric power vehicle according to claim 8,
 wherein the battery and the fuel tank are configured for simultaneous reception in a space configured for receiving a saddle type fuel tank.

13. The mounting structure for a battery and a fuel tank of a hybrid liquid fuel-electric power vehicle according to claim 8,
 wherein the battery is accessible from below the vehicle without requiring removal of the fuel tank.

14. A mounting structure for a battery and a fuel tank of a hybrid liquid fuel-electric power vehicle, comprising:
 a battery disposed on a first side of a propeller shaft, and a fuel tank disposed on a second side of the propeller shaft, opposite the first side in the vehicle width direction, such that the propeller shaft extends between the battery and the fuel tank, wherein the propeller shaft is disposed below a bearing surface of a rear seat, under a floor of the vehicle body so as to substantially extend in a fore-aft direction of the vehicle, wherein the battery and the fuel tank are disposed between a cross member and a rear sub frame, the cross member being disposed so as to substantially extend in a width direction of the vehicle, the battery is disposed between the propeller shaft and a side frame on the first side of the propeller shaft, the fuel tank is disposed between the propeller shaft and a side frame on the second side of the propeller shaft, the side frames disposed along lateral ends, in the vehicle width direction, of the floor, the side frames being connected to each other in the width direction of the vehicle by the cross member, the battery and the fuel tank are disposed in a portion surrounded by the cross member, the rear sub frame, and the side frames, and the battery and the fuel tank are disposed on opposite sides of the propeller shaft, in the vehicle width direction, in such a manner that no vertical plane, extending in the fore-aft direction of the vehicle, passes through any two of the battery, the fuel tank, and the propeller shaft.

* * * * *